US009138604B2

(12) United States Patent
Cleary et al.

(10) Patent No.: US 9,138,604 B2
(45) Date of Patent: Sep. 22, 2015

(54) AERIAL DELIVERY SYSTEM (75) Inventors: William Worden Cleary, Pasadena, CA (US); John A. Skorupa, Huntington Beach, CA (US); Ty F. Bonnar, Simi Valley, CA (US)

(73) Assignee: The Boeing Company, Chicago, IL (US)

(*) Notice: Subject to any disclaimer, the term of this patent is extended or adjusted under 35 U.S.C. 154(b) by 835 days.

(21) Appl. No.: 13/036,594

(22) Filed: Feb. 28, 2011

(65) Prior Publication Data

US 2012/0067973 A1 Mar. 22, 2012

Related U.S. Application Data (63) Continuation-in-part of application No. 12/181,139, filed on Jul. 28, 2008.

(51) Int. Cl.
*B64D 1/16* (2006.01)
*A62C 8/00* (2006.01)
*A62C 3/02* (2006.01)

(52) U.S. Cl.
CPC ............... *A62C 8/005* (2013.01); *A62C 3/0235* (2013.01); *B64D 1/16* (2013.01)

(58) Field of Classification Search
CPC .. A62C 3/06; A62C 99/0018; A62C 99/0072; A62C 31/02; A62C 8/005; A62C 3/0235; E21B 35/00; B64D 1/18; B64D 1/16; B05B 1/3006; B05B 3/105; B05B 7/0416

USPC ........ 169/82, 81, 51–53, 62, 26, 30; 244/149, 244/136, 137.3, 137.4, 142, 147, 148; 493/93, 94, 95, 96, 97, 98, 99, 100
See application file for complete search history.

(56) References Cited

U.S. PATENT DOCUMENTS

| 2,306,321 | A | * | 12/1942 | Roberts | 244/136 |
|---|---|---|---|---|---|
| 4,779,824 | A | * | 10/1988 | Leger | 244/137.3 |
| 4,919,306 | A | * | 4/1990 | Heaps et al. | 222/105 |
| 5,626,570 | A | | 5/1997 | Gallo | |
| 5,976,118 | A | | 11/1999 | Steer | |
| 7,009,029 | B2 | | 3/2006 | Oka et al. | |
| 7,090,029 | B2 | | 8/2006 | Cleary et al. | |
| 7,845,595 | B2 | | 12/2010 | Goddard | |
| 7,922,123 | B2 | * | 4/2011 | Deazley | 244/137.3 |

(Continued)

OTHER PUBLICATIONS

Weyerhaeuser, PCADS, Sep. 7, 2007, http://www.firebomberpublications.com/Weyerhaeuser_PCADS_Overview_2007.pdf.*
www.flexiblealternatives.com/products/pcads PCADS—Aerial Fire Fighting, printed Mar. 11, 2011.

(Continued)

*Primary Examiner* — Arthur O Hall
*Assistant Examiner* — Chee-Chong Lee
(74) *Attorney, Agent, or Firm* — Baldauff IP, LLC; Michael J. Baldauff, Jr.

(57) ABSTRACT

This disclosure is directed to apparatuses, systems, and methods associated with the aerial delivery of materials in a manner that is inexpensive, accurate, efficient, and effective. More specifically this disclosure teaches deploying an aerial delivery container holding some material from an aircraft and releasing the material from the aerial delivery container, all in a controlled manner, while the aerial delivery container is airborne. With reference to the exemplary embodiments, the apparatuses, systems and methods of the present disclosure are taught within the context of releasing a firefighting suppressant over a fire.

7 Claims, 7 Drawing Sheets

(56) References Cited

U.S. PATENT DOCUMENTS

| | | | |
|---|---|---|---|
| 2004/0195458 A1* | 10/2004 | Haggard | 244/142 |
| 2007/0065224 A1 | 3/2007 | Shaw | |
| 2007/0090174 A1* | 4/2007 | Goddard | 229/100 |
| 2010/0018724 A1 | 1/2010 | Cleary et al. | |
| 2011/0133036 A1* | 6/2011 | Goddard et al. | 244/137.3 |

OTHER PUBLICATIONS

U.S. Official Action dated Mar. 29, 2010 in U.S. Appl. No. 12/181,139.

U.S. Final Official Action dated Sep. 9, 2010 in U.S. Appl. No. 12/181,139.

* cited by examiner

```
                    ┌─────────────┐
       200          │    START    │
          ↘         └──────┬──────┘
                           ▼
       202  ┌──────────────────────────────┐
         ↘  │ ASSEMBLE AN AERIAL DELIVERY  │
            │          CONTAINER           │
            └──────────────┬───────────────┘
                           ▼
       204  ┌──────────────────────────────┐
         ↘  │  LOAD MATERIAL IN AERIAL     │
            │       DELIVERY CONTAINER     │
            └──────────────┬───────────────┘
                           ▼
       206  ┌──────────────────────────────────────┐
         ↘  │ ATTACH VERTICAL RESTRAINT SYSTEM AND │
            │ END CAP TO AERIAL DELIVERY CONTAINER │
            │ TO CONSTRUCT AERIAL DELIVERY SYSTEM  │
            └──────────────┬───────────────────────┘
                           ▼
       208  ┌──────────────────────────────┐
         ↘  │  LOAD AERIAL DELIVERY SYSTEM │
            │          ON AIRCRAFT         │
            └──────────────┬───────────────┘
                           ▼
       210  ┌──────────────────────────────────┐
         ↘  │ DEPLOY AERIAL DELIVERY SYSTEM    │
            │         FROM AIRCRAFT            │
            └──────────────┬───────────────────┘
                           ▼
       212          ┌─────────────┐
          ↘         │     END     │
                    └─────────────┘
```

*FIGURE 5*

AERIAL DELIVERY SYSTEM

CROSS-REFERENCE TO RELATED APPLICATION

This application is a continuation-in-part and claims the benefit of co-pending U.S. patent application Ser. No. 12/181,139, filed Jul. 28, 2008, assigned to the same assignee as this application, and which is expressly incorporated herein, in its entirety, by reference.

BACKGROUND

Conventional aerial firefighting includes the use of fixed and rotary wing aircraft, usually outfitted with tanks capable of holding thousands of gallons of water or other fire retardant. These aircraft, airtankers or waterbombers as they are sometimes called, are typically filled with fire retardant payloads and flown over fires where the payloads are dumped onto locations below in the hope of extinguishing, suppressing, or otherwise controlling the fire.

During an aerial firefighting attempt, airtankers typically fly at altitudes under 300 feet to improve the effectiveness of the material being dumped form the aircraft. Consequently, firefighting missions are frequently flown through thick smoke, shifting winds, and rugged terrain that often include tall trees and power lines. These conditions typically require aerial firefighting efforts to be performed during daylight hours with good visibility.

Aerial firefighting effectiveness using conventional airtankers is further limited by the problem of the entire payload typically being released over a single target. If only a portion of the payload is needed at a particular target, or if there are multiple targets requiring attention during the same mission the typical airtanker cannot usually adapt by adjusting payload release.

SUMMARY

One embodiment of the present disclosure is an aerial delivery system having a sleeve that holds material; a stay structure positioned at one end of the sleeve; an end cap positioned at another end of the sleeve; a vertical restraint system (VRS) tie securing the stay structure to the sleeve; a VRS tie severing device which is configured to sever the VRS tie; and a deployment strap extending from within the sleeve and attached to the end cap. Alternative and additional embodiments may further include a bladder positioned within the sleeve and attached to the deployment strap, which is configured to rupture the bladder in response to a sufficient force. In addition, there may be included a vertical restraint insert positioned within the sleeve between at least some of the material and the end cap, a VRS tie severing device attached to the end cap, an end cap tie, an end cap tie cutter which is configured to sever the end cap tie, and a deployment strap extending from the stay structure and attached to the end cap. Other embodiments may include combinations of these embodiments, and the like.

Another embodiment of the present disclosure is an aerial delivery system that includes a base having anchors positioned at a first end cap; a sleeve that contains a bladder which receives material, is engaged to the first end cap and has restraint apertures located at a second end; a second end cap that has end cap apertures, positioned at the second end and engaged to the sleeve; a vertical restraint insert positioned within the sleeve between the bladder and second end cap; a vertical restraint tie that is attached to an anchor, positioned through a restraint aperture, and is attached to another anchor to secure the base to the sleeve; a vertical restraint severing device configured to sever the vertical restraint tie attached to the second end cap; a deployment strap attached to the bladder at one end and attached at an opposite end to the second end cap; a deployment line attached to the top end cap and extending to the deployment strap; an end cap tie securing the second end cap to the base; and an end cap tie cutter configured to sever the end cap tie. Other embodiments may include combinations of these embodiments, and the like.

Other embodiments of the present disclosure provide methods for the aerial delivery of material. The operations of one method, which are not limited to the following sequence presented here for the purpose of teaching and not limitation, includes transporting in an aircraft an aerial delivery system having a sleeve that holds material, a stay structure positioned at one end of the sleeve, an end cap positioned at another end of the sleeve, a vertical restraint tie releasably securing the stay structure and end cap to the sleeve, a vertical restraint severing device configured to sever the vertical restraint tie, and a deployment strap extending from the sleeve and attached to the end cap; deploying the aerial delivery system from the aircraft while in flight; causing the vertical restraint severing device to sever the vertical restraint tie; causing the end cap to extend from the sleeve and exert a force on the deployment strap; causing the deployment strap to release the material; and causing the material within the sleeve to discharge from the sleeve.

Still other embodiments of the present disclosure provide methods for constructing an aerial delivery system. The operations of one method, which are not limited to the following sequence presented here for the purpose of teaching and not limitation, include positioning an aerial delivery container that is configured to hold material onto a base that has anchors; positioning at least one deployment strap, which is configured to release material from the aerial delivery container, from the interior of the aerial delivery container to the exterior of the aerial delivery container; securing the aerial delivery container to the base with at least one vertical restraint tie attached to an anchor, secured to the aerial delivery container, connected to a vertical restraint system tie severing device, and attached to a second anchor; placing an end cap on the aerial delivery container; attaching the vertical restrain system tie severing device to the end cap; and, attaching the deployment strap to the end cap. Other embodiments of methods for constructing an aerial delivery system include attaching the end cap to the base using at least one end cap tie, and connecting an end cap tie cutter to the end cap tie. Additional operations include placing material within the aerial delivery container.

Alternative and additional embodiments of methods may further include transporting an aerial delivery system having an end cap tie that secures the end cap to the sleeve and an end cap tie cutter, and causing the end cap tie cutter to sever the end cap tie. In addition, an embodiment may include the transporting of an aerial delivery system having a bladder located within the sleeve and at least partially filled with material, and causing the deployment strap to rupture the bladder. Further, an embodiment may include transporting an aerial delivery system having a deployment strap attached to the stay structure at one end and attached to the end cap at another end, and causing the deployment strap to withdraw the stay structure from the sleeve. Other embodiments may include combinations of these embodiments, and the like.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
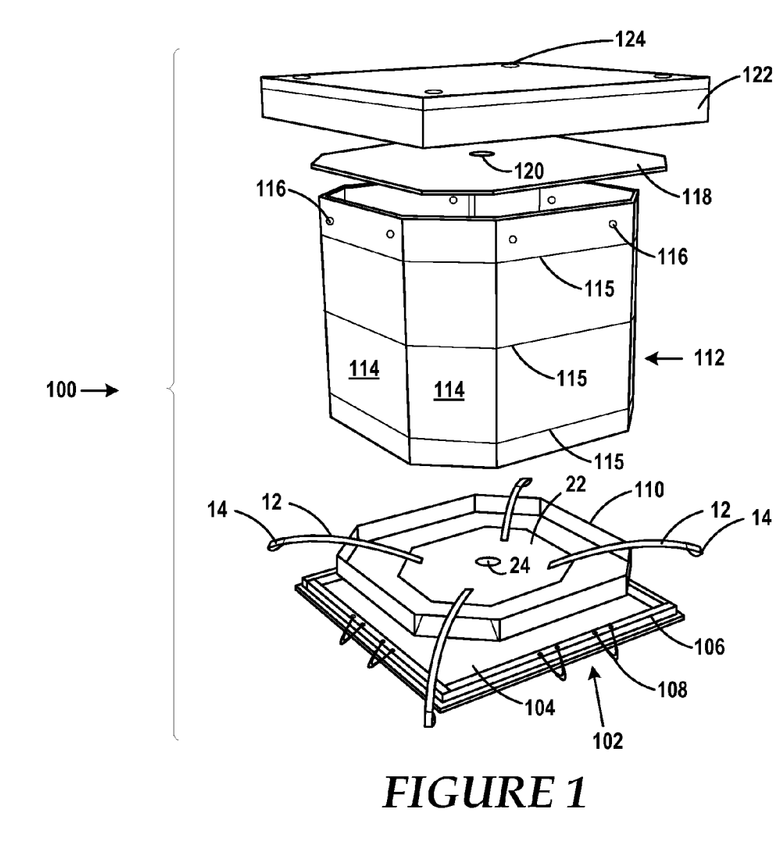
FIG. 1 shows the elements of an exemplary aerial delivery container.

Turning now to FIG. 1, there is illustrated an exemplary aerial delivery container 100 to which material 101 (best shown in FIG. 4D) is added for aerial delivery. Here, by way of illustration and not limitation, the material 101 to be added is a firefighting suppressant placed within the aerial delivery container 100 as explained herein. The illustrated aerial delivery container 100 has a base 102 comprising a plate 104, frame 106, and vertical restraint system anchors 108. Positioned adjacent to the base 102 is a first end cap 110 which receives a sleeve 112 comprising a plurality of panels 114, optional restraint bands 115, and restraint apertures 116. Positioned within the sleeve 112 is a restraint insert 118, having a fitting aperture 120 aligned to receive a bladder fitting. One purpose of the restraint insert 118 is to provide structural support to the vertical restrain system described herein, another purpose is to provide structural support to the sleeve 112. Adjacent to an end of the sleeve 112 is a second end cap 122 having end cap apertures 124, shown in the illustrated embodiment as positioned opposite the first end cap 110. In alternative embodiments the aerial delivery container 100 may have more than two ends, and in still other embodiments the ends may not be opposite each other.

Regarding the composition and manufacture of the materials used to form or construct the elements of the exemplary aerial delivery container 100, by way of illustration and not limitation, the plate 104 is a 1" AC plywood panel, the frame 106 is constructed of 2"×3" lumber, the VRS anchors 108 are formed of ½" tubular nylon, the first end cap 110 is formed of triple wall corrugated panel, the sleeve 112 is formed of a triple wall corrugated panel, the restraint bands 115 are formed of plastic, the restraint apertures 116 and end cap apertures 124 may be reinforced with grommets, the vertical restraint insert 118 is formed of triple wall corrugated panel, and the second end cap 122 is substantially formed of 2 triple wall corrugated panels reinforcing each other. The materials used to form or construct the elements described herein may be exchanged or otherwise substituted with each other, metals and metal derivatives, plastics and plastic derivatives, cellulose and cellulose derivatives, fibers and fiber derivatives, recycled or remanufactured products, bio-degradable products, combinations thereof, and the like.

Further, in alternative embodiments the aerial delivery container 100 itself as well as various elements may take alternative shapes, configurations, and designs. For example, the aerial delivery container 100 itself may be orientated such that one or more end caps are positioned along a horizontal axis rather than the vertical axis as illustrated, or at an acute or obtuse angle, or combinations thereof, and the like. In addition, the base 102 which is shown as square may have more or less sides or be circular, the end cap 110 and sleeve 112 which are shown as octangular may each have more or less sides or be circular, and the end cap 122 which is shown as square may have more or less sides or be circular, combinations thereof, and the like.

An exemplary method of assembling the illustrated aerial delivery container 100 may begin with positioning the first end cap 110 atop the base 102, placing a bladder 22 within the first end cap 110, and outwardly extending the bladder's deployment straps 12 toward and beyond the short walls or corners of the first end cap 110. The sleeve 112 is inserted within the first end cap 110 around the bladder 22. The deployment straps 12 are positioned along the exterior short walls of the sleeve 112 and placed under the restraint bands 115. The bladder 22 is filled with material 101 and a bladder fitting 24 closed. In the illustrated embodiment the bladder 22 is filled approximately to the level of the restraint apertures 116, or approximately 230 gallons (US). Bladders that are larger or smaller are contemplated and may be used. The restraint insert 118 is inserted within the sleeve 112 with the bladder fitting 24 extending through the bladder fitting aperture 120. Alternative embodiments may not include a bladder fitting aperture 120. The second end cap 122 is then placed over the sleeve 112.

Figures 2A, 2B:
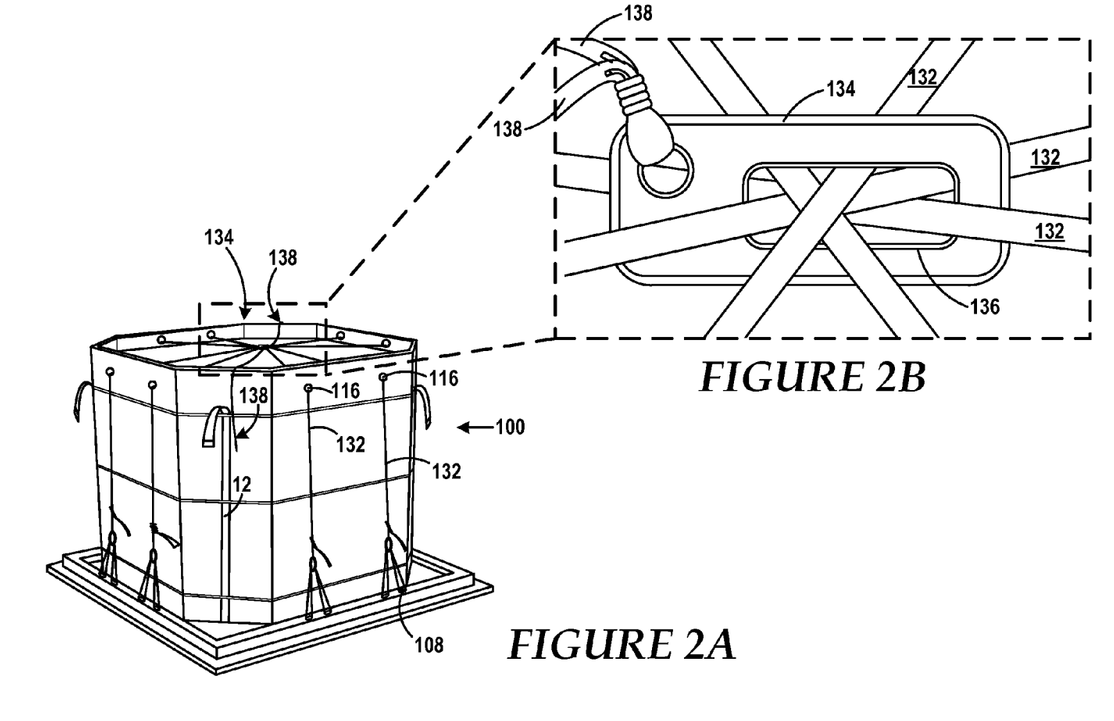
FIG. 2A illustrates an exemplary aerial delivery container with elements of an exemplary vertical restraint system.
FIG. 2B shows a plurality of vertical restraint ties and an exemplary vertical restraint tie severing device.
Figure 3A:
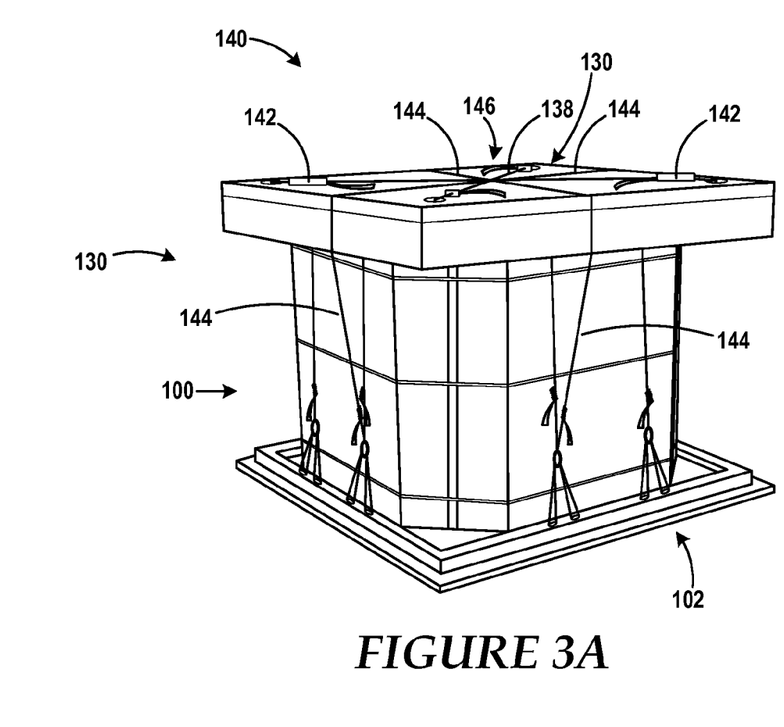
FIG. 3A shows an exemplary aerial delivery system comprising an exemplary aerial delivery container and an exemplary vertical restraint system.

To the assembled aerial delivery container 100 may be added a vertical restraint system (VRS) 130, best shown in FIG. 3A, to produce an exemplary aerial delivery system 140, as shown in FIG. 3A and FIGS. 4A-4D. Here, for purposes of the present teaching, the combination of the aerial delivery container 100 and the VRS 130 is referred to as an aerial delivery system 140. Referring now to FIGS. 2A and 2B, there are shown many of the components of the VRS 130 applied to the aerial delivery container 100. An exemplary method of applying the illustrated VRS 130 is to attach one end of a VRS restraint tie 132 to a VRS anchor 108 and thread the opposite end of the restraint tie 132 through the laterally associated restraint aperture 116, the VRS restraint tie severing device 134, the diagonally associated restraint aperture 116, and attach the opposite end of the VRS restraint tie 132 to the laterally associated VRS anchor 108. The remaining VRS restraint ties 132 are similarly threaded and attached, as illustrated. FIG. 2A shows the restraint ties 132 threaded through the VRS restraint tie severing device 134, here illustrated as a mini-knife having a cutting edge 136. The severing device 134 may be of any design configured to sever the VRS restraint ties 132. To the severing device 134 is attached a VRS severing device lanyard 138 with opposite lengths and ends extended toward and beyond the opposite short walls or corners of the aerial delivery container 100.

Various knots may be used to connect the various elements of the aerial delivery container 100 and VRS 130. In one embodiment, a surgeon's knot with locking knot is used to attach one end of a VRS restraint tie 132 to a VRS anchor 108. After threading the opposite end of the restraint tie 132 through the laterally associated restraint aperture 116, the VRS restraint tie severing device 134, the diagonally associated restraint aperture 116, the opposite end of the VRS restraint tie 132 is attached to a VRS anchor 108 using a trucker's hitch. One advantage of a trucker's hitch, or similar knot, is the ability to exert whatever force is necessary to sufficiently tighten each VRS restraint tie 132 and to hold the position of the VRS restraint tie 132. To the trucker's hitch is added an overhand knot in a double line, three half-hitch knots, and an overhand knot in the running end. A double girth knot may be used to tie the VRS severing device lanyard 138 to the VRS restraint tie severing device 134.

Regarding the composition and manufacture of the materials used to form or construct the elements of the exemplary VRS 130, by way of illustration and not limitation, the VRS restraint ties 132 are formed of ½" tubular nylon, the VRS restraint tie severing device 134 and cutting edge 136 is formed of steel, and the VRS severing device lanyard 138 is formed of ½" tubular nylon. The materials used to form or construct the various types of anchors, bands, ties, lanyards, lines, straps, and the like described herein may be exchanged or otherwise substituted with each other, with synthetic materials such as polypropylene and polyester, with natural materials such as manila, sisal, hemp and cotton, with combinations thereof, and the like. Regarding construction, these elements may be woven, laid, twisted, braided, cable, plaited, combinations thereof, and the like.

Figure 3B:
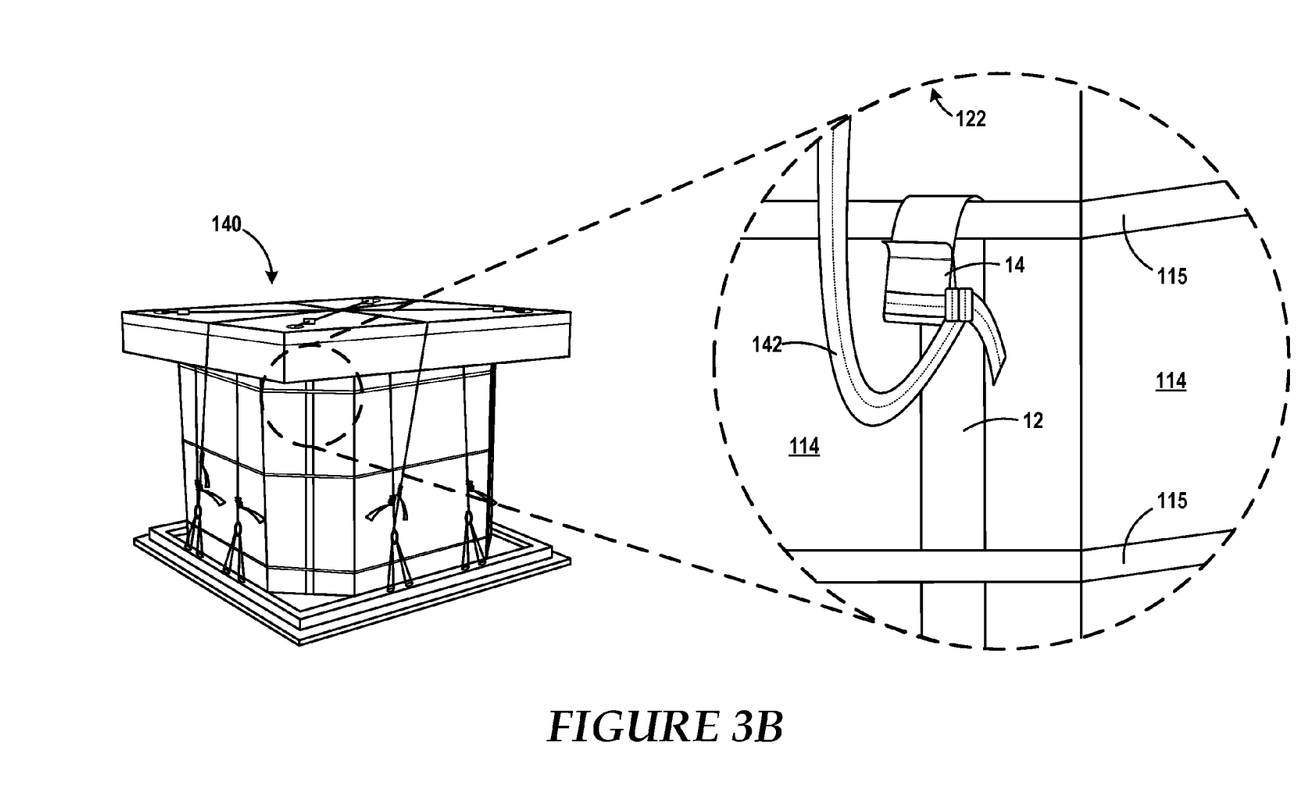
FIG. 3B illustrates an exemplary method of attaching an end cap to a deployment strap.

Turning now to FIGS. 3A and 3B, and continuing with an exemplary method of assembling the illustrated VRS 130, after the VRS restraint ties 132 are attached the second end cap 122 is positioned over the sleeve 112 with an orientation similar to the base 102. The opposite ends of the severing device lanyard 138 are threaded through the laterally associated end cap apertures 124, and the lengths are drawn together and attached such that the severing device lanyard 138 forms a loop connecting the severing device 134 to the second end cap 122. In one embodiment a surgeon's knot is used to tie together the ends of the VRS severing device lanyard 138, with a knot placed in the running end.

Four end cap deployment lines 142 are provided, with each deployment line 142 having an opposite end, and attached or crossed mid-span to each other to form a substantially symmetric "X" of four lengths. With the centers of the deployment lines 142 placed on top of and positioned approximately in the center of the second end cap 122, the ends of each deployment line 142 are threaded through a respective end cap aperture 124, and attached to the laterally associated deployment strap 12 through the respective strap loop 14, as best illustrated in FIG. 3A. In one embodiment a surgeon's knot is used to tie together the end of each deployment line 142 to each strap loop 14, with a knot placed in the running end. After each end of each deployment line 142 is attached to its laterally associated deployment strap 12, the slack of each length of deployment line 142 is folded and the folded section removably attached to the second end cap 122.

Similar to the end cap deployment lines 142 described above, two end cap ties 144 are provided, with each end cap tie 144 having an opposite end and attached or crossed mid-span to each other to form a substantially symmetric "X". The center of the two end cap ties 144, that is, the "X" section, is positioned approximately at the center of the second end cap 122 and the opposite ends of each end cap tie 144 are each attached to a VRS anchor 108 located at opposite sides of the base 102 such that the end cap 122 is secured along each outer edge. In one embodiment the end cap tie is an 80 pound line and each end is attached to a respective anchor using a surgeon's knot. An end cap tie cutter 146, which may be similar to the VRS restraint tie severing device 134, is provided and positioned at the crossed mid-span of the end cap ties 144 with each end cap tie 144 threaded so that each can be severed by the end cap tie cutter 146.

The illustrated end cap tie cutter 146 is a mini-knife. The end cap tie cutter 146 may be of any design configured to sever the end cap tie 144. Alternatively, a friction cutter, or a delay cutter such as a pyro-cutter activated by removing only a safety pin, or a pyro-cutter having a timer initiating pin, or combinations thereof, and the like, may be substituted for either or both of the illustrated VRS restraint tie severing device 134 and/or end cap tie cutter 146. Alternative cutters and delay cutters and methods of initiating the delay device may be used, such as but not limited to cutters that are remote controlled; cutters initiated by sensors that are activated in response to altitude or ambient pressure; cutters initiated by chemical releases or electric circuitry; cutters initiated by differential spacing during deployment; combinations thereof and the like.

An aerial delivery system 140, or a group of aerial delivery systems 140, can be loaded, secured, and deployed in different configurations based on the aircraft, tactics, and desired number of units for an air drop. Embodiments of the aerial delivery systems and methods taught herein can withstand at least a 2 g vertical force, at least a 3 g forward force, at least a 1.5 g aft force, at least a 1.5 g lateral force, and deploy approximately 230 gallons (US) or more of material 101 per aerial delivery container. Other embodiments of the aerial delivery systems and methods taught herein can withstand lesser forces, and some embodiments can withstand greater forces. An exemplary method of deploying the illustrated aerial delivery system 140 is now shown with reference to FIGS. 4A-4D, and in the context of airdropping a single column of eight aerial delivery systems 140 from the cargo hold of a C-130 or C-17 at an altitude of 1000 ft. Alternative aircraft and altitudes are contemplated, such as and not limited to other fixed wing aircraft, rotary wing aircraft, and altitudes both above and below 1000 ft.

In preparation for staging and loading onto the aircraft, dunnage may be added fore and aft of each aerial delivery container 100 to fill voids between adjacent aerial delivery containers 100, in order to reduce movement and possible surge during flight. The individual aerial delivery systems 140 are loaded onto the aircraft and, following standard container tie down and restraint procedures applicable to that aircraft, secured in the cargo hold. Here, for the purposes of illustration and teaching, the end cap tie cutter 146 of each aerial delivery system 140 is a pyro-cutter having a timer and timer initiating pin, which timer will be initiated by removing the timer initiating pin. The inclusion of a timer in an embodiment, and the type and nature of the timer, may depend on delivery and tactical factors, such as flight altitude. Accordingly, one method of activating the group of pyro-cutters is to secure one end of a pin line (not shown) to an adjacent ADS 140 and attach a pin line to the initiating pin of the lead or aft end cap tie cutter 146 (the end cap tie cutter 146 on the first aerial delivery system 140 to be deployed from the cargo hold). Continue in that manner until the pin lines are sequentially attached to each timer initiating pin of each aerial delivery system 140. In this regard the cutters are initiated by differential spacing during deployment. Alternative delay cutters and methods of initiating the delay device may be used, such as but not limited to cutters that are remote controlled; cutters initiated by sensors that are activated in response to altitude or ambient pressure; cutters initiated by chemical releases or electric circuitry; combinations thereof and the like. The eight aerial delivery containers are now ready to be deployed.

Figure 4A:
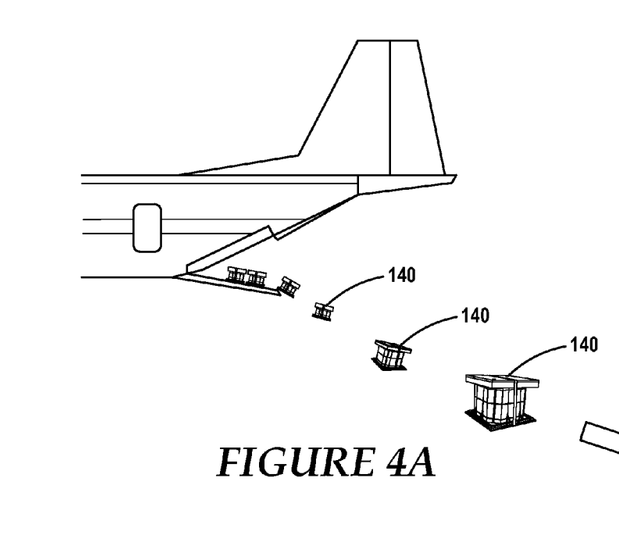
FIGS. 4A-4D illustrates an exemplary method of deploying an exemplary aerial delivery system.
Figure 4B:
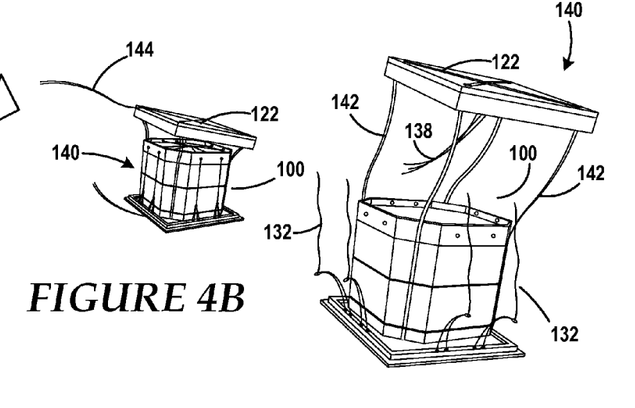

With the aircraft in flight, the cargo hold door open, and the cargo readied for airdrop, the aerial delivery systems 140 are deployed, as best shown in FIG. 4A. Here, as each aerial delivery system 140 is deployed the end cap tie pyro-cutter is activated because the timer initiating pin has been removed by the pin line, and the pyro-cutter will sever the end cap ties 144 according to the length of delay provided by the timer. In alternative embodiments where end cap ties 144 may not be included, such as but not limited to an airdrop at an altitude of less than 500 ft., the end cap tie cutter 146 may be eliminated. With the end cap ties 144 absent or severed, as an aerial delivery system 140 free-falls the second end cap 122 catches air between its overhanging edges and the aerial delivery container 100. As best shown in FIG. 4B, the pressure of this air resistance separates the second end cap 122 from the aerial delivery container 100 for a distance, at least momentarily, of the extended length of the loop formed by the VRS severing device lanyard 138.

Figure 4C:
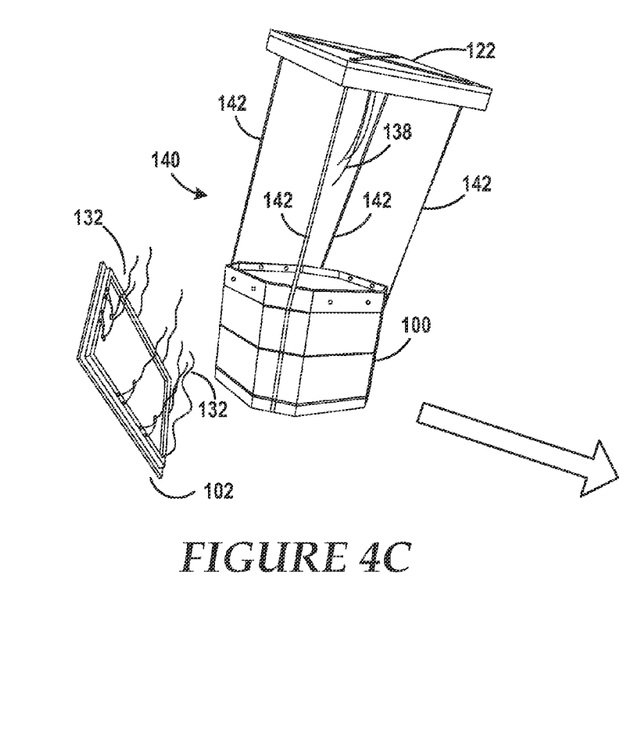

With the upward pressure of air resistance still applied to the bottom surface of the second end cap 122 of a free-falling aerial delivery system 140, the VRS restraint tie severing device 134 is pulled upwardly with sufficient force to sever the VRS restraint ties 132. (In the context of the present disclosure the words "upward", "downward", "outward", and the like, and any of their derivatives are merely for the purpose of teaching a direction in relation to the trajectory of the free-falling aerial delivery system 140. Similarly, those words and other words used herein that simply reference direction or orientation, such as "bottom", "top", "fore", "aft", and the like, are used merely for the present purposes of teaching and description, and none are used in any sense that limits or restricts.) In an alternative embodiment, the VRS restraint tie severing device 134 is a pyro-cutter with its initiating pin removed by the loop formed by the VRS severing device lanyard 138. As best shown in FIG. 4C, with the VRS restraint ties 132 severed and the upward pressure of air resistance still applied to the bottom surface of second end cap 122 the end cap deployment lines 142 are fully extended but, briefly, have not yet exerted sufficient force to draw or pull the deployment straps 12.

Figure 4D:
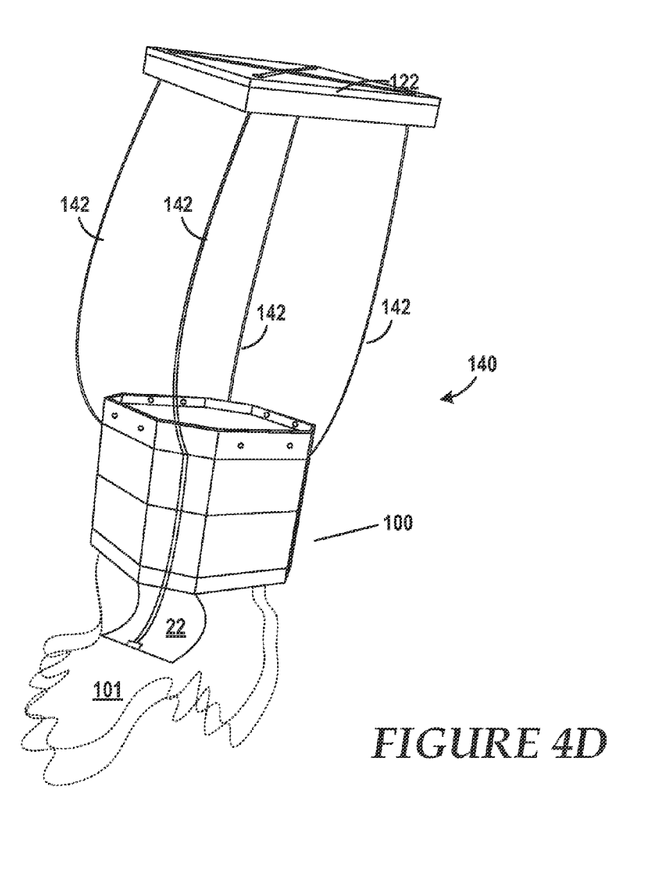

As the second end cap 122 continues to pull away from the free-falling aerial delivery container 100 the tension in the deployment lines 142 increases sufficiently to generate a force great enough to draw or pull the deployment straps 12. A sufficient drawing or pulling of the deployment straps 12 causes at least two actions. One is that the deployment straps 12 are pulled outwardly and tear the bladder 22. The other is that the first end cap 110 separates from the aerial delivery container 100. By about this time, in the illustrated exemplary embodiment, the base 102 has separated from the aerial delivery container 100. The tearing of the bladder 22 releases the contents of the bladder 22, as best shown in FIG. 4D. The apparatuses, systems, and methods taught herein provide, among other advantages, a controlled aerial delivery of material 101, such as a firefighting suppressant to a fire.

The subject matter described herein is provided by way of illustration for the purposes of teaching, suggesting, and describing, and not limiting. Alternatives to the illustrated embodiment are contemplated, described herein, and set forth in the claims. For example, in addition to the alternative embodiments described above, for another alternative embodiment the base 102 is eliminated and the anchors 108 are secured directly to the first end cap 110. For a third alternative embodiment the first end cap 110 is substituted with a second vertical restraint insert 118, positioned near the end of the aerial delivery container 100 from which the material 101 will exit, which stays the material 101 within the aerial delivery container 100. In this third alternative embodiment VRS restraint ties 132 are positioned to stay the second vertical restraint insert 118 and may include a second VRS restraint tie severing device 134. In a fourth alternative embodiment VRS restraint ties 132 only are positioned near the end of the aerial delivery container 100 from which the material 101 will exit, to stay the material 101. In all the embodiments the material 101 within the aerial delivery container 100 is stayed by a stay structure positioned near the end of the aerial delivery container 100 from which the material 101 will exit. Here the term "stay structure" includes and is not limited to one or more of the base 102, first end cap 110, second vertical restraint insert 118, VRS restraint ties 132, combinations thereof, and the like. In a fifth alternative embodiment at least one deployment strap 12 is attached to a stay structure. In this fifth embodiment a sufficient drawing or pulling of the deployment straps 12 attached to a stay structure will separate the stay structure from the aerial delivery container 100 in order to release the material 101. Additional alternative embodiments include combinations of the embodiments taught herein.

Figure 5:
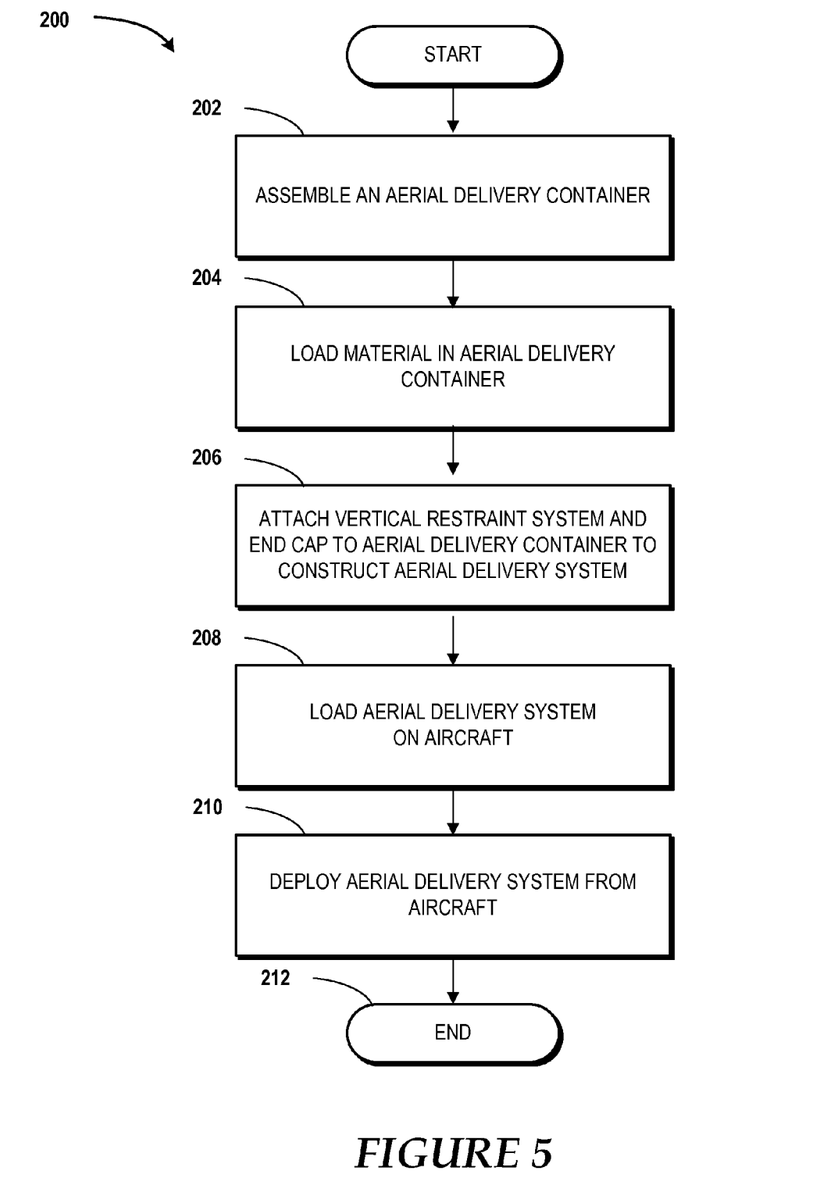
FIG. 5 illustrates a flow chart directed to an exemplary method of assembling and deploying an aerial delivery system.

Turning now to FIG. 5, an illustrative routine 200 for the aerial delivery of material 101 will now be described. It should be appreciated that more or fewer operations may be performed than shown in FIG. 5 and described herein. Moreover, these operations may also be performed in a different order than the order described herein.

The routine 200 begins at operation 202 with the assembly of the aerial delivery container 100. One method of assembling the aerial delivery container 100 includes positioning the first end cap 110 atop the base 102, placing the bladder 22 within the first end cap 110, and outwardly extending the bladder's deployment straps 12 toward and beyond the short walls or corners of the first end cap 110. The sleeve 112 is inserted within the first end cap 110 around the bladder 22 and over the extended deployment straps 12. The deployment straps 12 are positioned along the exterior short walls of the sleeve 112 and placed under the restraint bands 115.

The routine 200 continues from operation 202 to operation 204, where the bladder 22 is filled with material 101 and the bladder fitting 24 capped or otherwise closed. The restraint insert 118 is inserted within the sleeve 112 with the bladder fitting 24 extending through the bladder fitting aperture 120.

The routine 200 continues from operation 204 to operation 206, where the vertical restraint system (VRS) 130 is attached to the aerial delivery container 100. One method of attaching the VRS 130 is to attach one end of each VRS restraint tie 132 to a VRS anchor 108 and thread the opposite end of each restraint tie 132 through the laterally associated restraint aperture 116, the VRS restraint tie severing device 134, the diagonally associated restraint aperture 116, and attach the opposite end of the VRS restraint tie 132 to the laterally associated VRS anchor 108. To the severing device 134 is attached a VRS severing device lanyard 138 with opposite lengths and ends extended toward and beyond the opposite short walls or corners of the aerial delivery container 100.

After the VRS restraint ties 132 are attached the second end cap 122 is positioned over the sleeve 112 with an orientation similar to the base 102. The opposite ends of the severing device lanyard 138 are threaded through the laterally associated end cap apertures 124, and the lengths are drawn together and attached such that the severing device lanyard 138 forms a loop connecting the severing device 134 to the second end cap 122. Four end cap deployment lines 142 are provided; the ends of each deployment line 142 are threaded through a respective end cap aperture 124, and attached to the laterally associated deployment strap 12 through the respective strap loop 14. Two end cap ties 144 are provided and each are attached to a VRS anchor 108 located at opposite sides of the base 102 such that the end cap 122 is secured along each outer edge to construct the illustrated aerial delivery system 140.

The routine 200 continues from operation 206 to operation 208, where one or more aerial delivery systems 140 are loaded onto an aircraft and, following the container tie down and restraint procedures applicable to that aircraft, are secured in the cargo hold. An end cap tie cutter 146 which is a gyro-cutter with timer and timer initiating pin may be attached to one or more of the aerial delivery systems 140. This operation may include preparing for the activation of the timer on one or more aerial delivery systems 140.

The routine 200 continues from operation 208 to operation 210, where the aerial delivery system 140 is deployed from the aircraft. With the aircraft in flight, as each aerial delivery system 140 is deployed the end cap tie gyro-cutters are activated. With the end cap ties 144 absent or severed, as an aerial delivery system 140 free-falls the second end cap 122 catches air between its overhanging edges and the aerial delivery container 100. With the upward pressure of air resistance applied to the bottom surface of the second end cap 122 the VRS restraint tie severing device 134 is pulled upwardly with sufficient force to sever the VRS restraint ties 132. As the second end cap 122 continues to pull away from the free-falling aerial delivery container 100 the tension in the deployment lines 142 increases sufficiently to generate a force great enough to draw or pull the deployment straps 12. A sufficient drawing or pulling of the deployment straps 12 causes the deployment straps 12 to be pulled outwardly and tear the bladder 22, which results in the aerial delivery of the contents of the bladder 22. After aerial delivery of the material 101 at operation 210 the routine 200 ends at 212.

The subject matter described above is provided by way of illustration only and should not be construed as limiting. Various modifications and changes may be made to the subject matter described herein without following the exemplary embodiments and applications illustrated and described, and without departing from the true spirit and scope of the present disclosure, which is set forth in the following claims.

What is claimed is:

1. An aerial delivery system, comprising:
    a bladder configured to contain material;
    a sleeve positioned around the bladder;
    a stay structure positioned at a first end of the sleeve;
    an end cap positioned at a second end of the sleeve;
    at least one vertical restraint system tie releasably securing the stay structure to the sleeve;
    a vertical restraint system tie severing device comprising a cutting edge and configured to receive and sever the at least one vertical restraint system tie; and,
    at least one deployment strap extending from the bladder;
    at least one end cap deployment line, each end cap deployment line connected at a first end to a first deployment strap, extending through a first aperture in the end cap, across a top surface of the end cap, through a second aperture in the end cap, and connected at a second end to a second deployment strap;
    at least one end cap tie, each end cap tie connected at a first end to the stay structure, extending over a first edge of the end cap, across a top surface of the end cap, over a second edge of the end cap, and connected at a second end to the stay structure; and
    an end cap tie cutter configured to sever the at least one end cap tie according to a predetermined delay, altitude, or ambient pressure.

2. The aerial delivery system of claim 1, wherein the at least one deployment strap is configured to rupture the bladder in response to a force.

3. The aerial delivery system of claim 1, further comprising a vertical restraint insert positioned within the sleeve between at least some of the material and the end cap.

4. The aerial delivery system of claim 1, wherein the vertical restraint system tie severing device is attached to the end cap.

5. The aerial delivery system of claim 1, wherein the vertical restraint system tie severing device is configured to sever the vertical restraint system tie according to a predetermined delay, altitude, or ambient pressure.

6. The aerial delivery system of claim 1, wherein the stay structure comprises a base including at least one vertical restraint system anchor, the at least one vertical restraint system tie attached to the at least one vertical restraint system anchor.

7. The aerial delivery system of claim 1, wherein one or more of the bladder, the sleeve, the stay structure, the end cap, the vertical restraint system tie severing device, the at least one deployment strap, the at least one end cap deployment line, the at least one end cap tie, and the end cap tie cutter of the aerial delivery system is biodegradable.

* * * * *